United States Patent
Poulin et al.

(10) Patent No.: US 11,768,391 B2
(45) Date of Patent: Sep. 26, 2023

(54) CARRIER DEPLETION-BASED SILICON PHOTONIC MODULATOR USING CAPACITIVE COUPLING

(71) Applicant: Ciena Corporation, Hanover, MD (US)

(72) Inventors: Michel Poulin, Québec (CA); Alexandre Delisle-Simard, Québec (CA); Charles Baudot, Québec (CA)

(73) Assignee: Ciena Corporation, Hanover, MD (US)

( * ) Notice: Subject to any disclaimer, the term of this patent is extended or adjusted under 35 U.S.C. 154(b) by 93 days.

(21) Appl. No.: 17/570,332

(22) Filed: Jan. 6, 2022

(65) Prior Publication Data

US 2022/0252911 A1    Aug. 11, 2022

Related U.S. Application Data

(60) Provisional application No. 63/146,330, filed on Feb. 5, 2021.

(51) Int. Cl.
    *G02F 1/025*      (2006.01)
    *G02F 1/21*      (2006.01)
    (Continued)

(52) U.S. Cl.
    CPC ......... *G02F 1/025* (2013.01); *G02B 6/12004* (2013.01); *G02F 1/212* (2021.01);
    (Continued)

(58) Field of Classification Search
    CPC ........ G02F 1/025; G02F 1/212; G02F 1/2255; G02B 6/12004; G02B 2006/12061; G02B 2006/12097; G02B 2006/12142
See application file for complete search history.

(56) References Cited

U.S. PATENT DOCUMENTS

| | | |
|---|---|---|
| 7,352,931 B1 | 4/2008 | Painchaud et al. |
| 8,095,615 B2 | 1/2012 | Briscoe et al. |

(Continued)

FOREIGN PATENT DOCUMENTS

| | | |
|---|---|---|
| WO | 2019148011 A1 | 8/2019 |
| WO | 2021015981 A1 | 1/2021 |

OTHER PUBLICATIONS

Ummethala et al., "Hybrid Electro-Optic Modulator Combining Silicon Photonic Slot Waveguides with High-k Radio-Frequency Slotlines," 2020, pp. 1-16.

(Continued)

*Primary Examiner* — Ellen E Kim
(74) *Attorney, Agent, or Firm* — Baratta Law PLLC; Lawrence A. Baratta, Jr.

(57) ABSTRACT

A carrier depletion-based Silicon Photonic (SiP) modulator using capacitive coupling includes a high-k dielectric material in or on slabs, between a rib. A capacitance ($C_k$) of the high-k dielectric material is larger than a capacitance ($C_{pn}$) of the rib, thereby reducing the high frequency impedance and improving bandwidth of the modulator. A modulator includes a first electrode; a first slab connected to the first electrode at a first end; a rib connected to the first slab at a second end of the first slab; a second slab connected to the rib at a first end; a second electrode connected to the second slab at a second end of the second slab; and a high-k dielectric material disposed in or on a portion of each of the first slab and the second slab, thereby enabling capacitive coupling.

20 Claims, 8 Drawing Sheets

(51) Int. Cl.
*G02F 1/225* (2006.01)
*G02B 6/12* (2006.01)

(52) U.S. Cl.
CPC .. *G02F 1/2255* (2013.01); *G02B 2006/12061* (2013.01); *G02B 2006/12097* (2013.01); *G02B 2006/12142* (2013.01)

(56) References Cited

U.S. PATENT DOCUMENTS

| | | | |
|---|---|---|---|
| 8,406,621 B2 | 3/2013 | Painchaud et al. | |
| 8,619,824 B2 | 12/2013 | Ayotte et al. | |
| 8,767,778 B2 | 7/2014 | Briscoe et al. | |
| 9,354,396 B2 | 5/2016 | Baudot | |
| 9,632,335 B2* | 4/2017 | Patel | G02F 1/2257 |
| 9,703,047 B2 | 7/2017 | Painchaud et al. | |
| 9,778,415 B2 | 10/2017 | Fincato et al. | |
| 9,791,346 B1 | 10/2017 | Carpentier et al. | |
| 9,823,419 B1 | 11/2017 | Pelletier et al. | |
| 9,851,521 B2 | 12/2017 | Pelletier et al. | |
| 9,933,576 B2 | 4/2018 | Baudot | |
| 9,941,973 B2 | 4/2018 | Simard et al. | |
| 10,101,528 B2 | 10/2018 | Guerber et al. | |
| 10,197,821 B2 | 2/2019 | Poulin et al. | |
| 10,359,652 B2 | 7/2019 | Baudot et al. | |
| 10,371,895 B2 | 8/2019 | Painchaud et al. | |
| 10,705,294 B2 | 7/2020 | Guerber et al. | |
| 10,830,638 B2 | 11/2020 | Pelletier et al. | |
| 10,908,438 B1* | 2/2021 | Wood | G02F 1/0081 |
| 10,908,474 B2 | 2/2021 | Vitic et al. | |
| 10,955,615 B2 | 3/2021 | Picard et al. | |
| 2004/0008413 A1 | 1/2004 | Trepanier et al. | |
| 2009/0299082 A1 | 12/2009 | Baudot et al. | |
| 2015/0212386 A1* | 7/2015 | Patel | G02B 6/136 385/3 |
| 2016/0233641 A1 | 8/2016 | Chantre et al. | |
| 2017/0059893 A1 | 3/2017 | LeMaitre et al. | |
| 2017/0192170 A1 | 7/2017 | Baudot et al. | |
| 2018/0314083 A1 | 11/2018 | Latrasse et al. | |
| 2018/0329140 A1 | 11/2018 | Boeuf et al. | |
| 2019/0285799 A1 | 9/2019 | Guerber et al. | |
| 2020/0057350 A1* | 2/2020 | Amin | G02F 1/025 |
| 2020/0064707 A1 | 2/2020 | Vitic | |
| 2020/0073051 A1 | 3/2020 | Baudot et al. | |
| 2020/0241201 A1 | 7/2020 | Boeuf et al. | |
| 2020/0363665 A1 | 11/2020 | Latrasse et al. | |
| 2021/0124234 A1 | 4/2021 | Vitic et al. | |
| 2021/0257507 A1 | 8/2021 | Baudot et al. | |
| 2021/0266066 A1 | 8/2021 | Bois et al. | |

OTHER PUBLICATIONS

Rausch et al., "A Performance Comparison of Single-Ended- and Differential Driving Scheme at 64 Gbit/s QPSK Modulation for InP-Based IQ-Mach-Zehnder Modulators in Serial-Push-Pull Configuration," Ecoc 2015—ID: 0667, pp. 1-3.

Ummethala et al., "Hybrid electro-optic modulator combining silicon photonic slot waveguides with high-k radio-frequency slotlines," Research Article, vol. 8, No. 4, Apr. 2021, Optica, pp. 511-519.

Ummethala et al., "Hybrid electro-optic modulator combining silicon photonic slot waveguides with high-k radio-frequency slotlines: supplement," Optica, Supplemental Document, Apr. 9, 2021, pp. 1-14.

* cited by examiner

CARRIER DEPLETION-BASED SILICON PHOTONIC MODULATOR USING CAPACITIVE COUPLING

CROSS-REFERENCE TO RELATED APPLICATIONS

The present disclosure claims priority to U.S. Provisional Patent Application No. 63/146,330, filed Feb. 5, 2021, the contents of which are incorporated by reference in their entirety.

FIELD OF THE DISCLOSURE

The present disclosure generally relates to optical modulators. More particularly, the present disclosure relates to systems and methods for a carrier depletion-based Silicon Photonic (SiP) modulator using capacitive coupling.

BACKGROUND OF THE DISCLOSURE

Ummethala, Sandeep, et al. "Hybrid electro-optic modulator combining silicon photonic slot waveguides with high-k radio-frequency slotlines." Optica 8.4 (2021): 511-519, the contents of which are incorporated by reference, propose incorporating capacitive coupling with Silicon-Organic Hybrid (SOH) slot-waveguide modulators. Ummethala et al. describe a novel concept for hybrid silicon photonic modulators that allows combining the high efficiency of organic electro-optic materials with large modulation bandwidths without the need for lossy plasmonic structures. The device overcomes the RC (resistor-capacitor) limitations of conventional SOH slot-waveguide modulators by replacing resistive coupling through the doped Silicon (Si) slabs with a capacitive coupling via high-k dielectric material. As noted in Ummethala et al., the Electro-Optic (EO) bandwidth of highly efficient slot-waveguide SOH modulators is limited to, e.g., 25 GHz or less due to the RC time constant associated with the capacitance of the slot and the resistance of the adjacent doped Si slabs.

As such, capacitive coupling can provide opportunities to improve bandwidth, which is explored herein.

BRIEF SUMMARY OF THE DISCLOSURE

The present disclosure relates to systems and methods for a carrier depletion-based Silicon Photonics (SiP) modulator using capacitive coupling. The present disclosure applies a capacitive coupling scheme to a PN junction modulator with a hybrid resistive-capacitive coupling scheme and corresponding techniques to bias the modulator. The hybrid resistive-capacitive coupling scheme simplifies the required biasing and ensures that DC $V_{pi}$ is maintained (i.e., that the frequency response at low frequency is the same). This approach is particularly well-suited in conjunction with a modulator described in commonly-assigned U.S. patent application Ser. No. 16/554,736, filed Aug. 29, 2019, and entitled "Silicon photonics modulator using TM mode and with a modified rib geometry," the contents of which are incorporated by reference in their entirety. The Transverse Magnetic TM mode is already very-well confined; having a very confined mode will allow reducing the capacitance of the modulator while keeping $V_{pi}$ constant. Also, a pure capacitive coupling approach can be used, which is well suited in conjunction with the use of a TM modulator on thick silicon.

A carrier depletion-based Silicon Photonic (SiP) modulator using capacitive coupling includes a high-k dielectric material in or on slabs, between a rib. A capacitance ($C_k$) of the high-k dielectric material is larger than a capacitance ($C_{pn}$) of the rib, thereby reducing the high frequency impedance and improving bandwidth of the modulator.

In an embodiment, a modulator, such as illustrated in FIG. 10, includes a first electrode; a first slab connected to the first electrode at a first end; a rib, with a pn junction, connected to the first slab at a second end of the first slab; a second slab connected to the rib at a first end; a second electrode connected to the second slab at a second end of the second slab; and a high-k dielectric material disposed in or on a portion of each of the first slab and the second slab, thereby enabling capacitive coupling.

A capacitance ($C_k$) of the high-k dielectric material is larger than a capacitance ($C_{pn}$) of the rib. The rib can have a larger height than the first slab and the second slab. The high-k dielectric material can be located in the first slab and the second slab. The high-k dielectric material can be located on a top portion of the first slab and the second slab. The first slab and the second slab can include progressively increasing concentration doping moving away from the rib, to reduce resistance in this region.

The modulator can be a Mach-Zehnder modulator, a phase modulator, an intensity modulator, a Series Push-Pull modulator, or a Transverse Magnetic modulator, having a larger rib than the first and second slabs. The modulator can further include a connection to apply a bias voltage to the pn junction.

In another embodiment, a modulator circuit includes a pair of electrodes; a pair of slabs; a rib, with a pn junction, in between the pair of slabs; wherein the pair of slabs has a capacitance of $C_k$ and resistance of $R_{par}$, wherein the rib has a capacitance of $C_{pn}$ and resistance of $R_{ser}$, and wherein $C_k \gg C_{pn}$. The modulator circuit can include a high frequency impedance of $$Z = R_{ser} + \frac{2R_{par}}{1 + i\omega R_{par} C_k},$$

thereby reducing the high frequency impedance and improving bandwidth of the modulator circuit. The pair of slabs can include a high-k dielectric material. The pair of slabs can include a high-k dielectric material located on top of the pair of slabs. The rib can have a larger height than the pair of slabs. The modulator circuit can include a connection to apply a bias voltage to the pn junction.

In a further embodiment, a method includes forming a silicon photonics modulator including a pair of slabs and a rib located therebetween; and including high-k dielectric material on or in the pair of slabs to increase capacitance in the pair of slabs. The method can further include providing a connection to apply a bias voltage to the pn junction

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for a carrier depletion-based Silicon Photonics (SiP) modulator using capacitive coupling. The present disclosure applies a capacitive coupling scheme to a PN junction modulator with a hybrid resistive-capacitive coupling scheme and corresponding techniques to bias the modulator. The hybrid resistive-capacitive coupling scheme simplifies the required biasing and ensures that DC $V_{pi}$ is maintained (i.e., that the frequency response at low frequency is the same). This provides low $V_{pi}$ with large bandwidth modulators. This approach is particularly well-suited in conjunction with a modulator described in commonly-assigned U.S. patent application Ser. No. 16/554,736, filed Aug. 29, 2019, and entitled "Silicon photonics modulator using TM mode and with a modified rib geometry," the contents of which are incorporated by reference in their entirety. The TM mode is already very-well confined; having a very confined mode will allow reducing the capacitance of the modulator while keeping $V_{pi}$ constant. Also, a pure capacitive coupling approach can be used, which is well suited in conjunction with the use of a TM modulator on thick silicon.

Figure 1A:
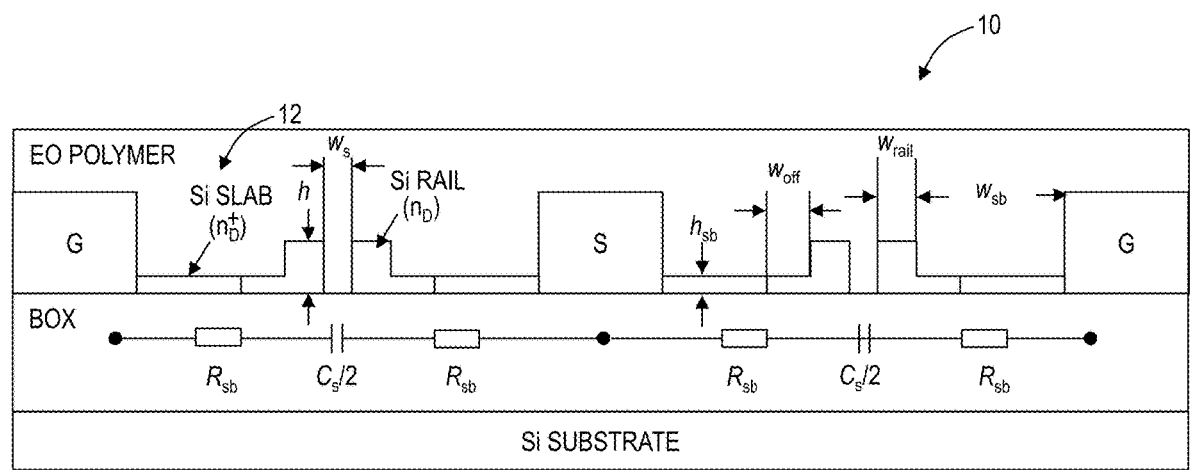
FIGS. 1A and 1B are a slot waveguide Silicon-Organic Hybrid (SOH) modulator from Ummethala et al., with FIG. 1A illustrating resistive coupling and FIG. 1B illustrating capacitive coupling.
Figure 1B:
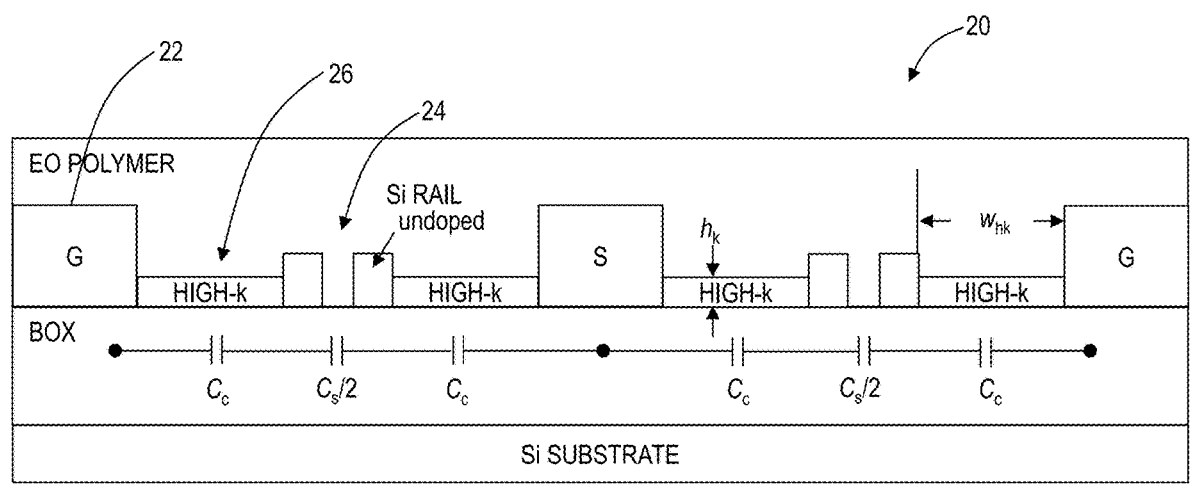

The present disclosure incorporates the concept of capacitive coupling, proposed in a paper by Ummethala et al. into a carrier-depletion silicon photonic modulator. The modulator described in Ummethala et al. is referred to herein as a Karlsruhe Institute of Technology (KIT) modulator 10. The modulator 10 is based on a slot waveguide (the slot is the gap of width $w_s$ in the center of the optical waveguide in FIG. 1). The optical mode is very concentrated in the slot area which is filled with a non-linear polymer whose index changes with the applied voltage in the slot area (through Pockels effect). The legacy modulator 10 uses resistive coupling: the voltage from the Radio Frequency (RF) electrodes is transferred to the slot area via direct contact through a silicon slab 12. Due to the large resistance of this thin slab 12, the voltage applied to the slot area is reduced.

The modulator described in Ummethala et al. is referred to herein as a Karlsruhe Institute of Technology (KIT) modulator 20. The modulator 20 uses capacitive coupling to transfer more efficiently the voltage from RF electrodes 22 to a slot area 24. For this, a capacitor ($C_c$) bearing higher capacitance than the slot waveguide is formed between the metal electrode 22 and a slot area 24 (waveguide). Thus, the AC voltage drop across the resistive elements is alleviated, and the RF electrode 22 voltage appears predominantly across the slot area 24, increasing the bandwidth of the modulator 20 very efficiently without penalizing the modulator DC $V_{pi}$.

In order that the side capacitor ($C_c$) has a larger capacitance than the slot capacitance ($C_s$), a high-k dielectric 26 is deposited between the RF electrode 22 and the slot 24 (waveguide). High-k materials have a dielectric constant (in the RF domain) much larger than that of $SiO_2$ (as defined by the electronics industry). This high-k material must also possess a refractive index in the C-band (around 1525 nm to 1565 nm) lower than that of silicon so that the mode remains confined within the slot waveguide. Furthermore, the absorption in the C-band should also be minimal. The KIT modulator 10 used amorphous Barium titanate ($BaTiO_3$) (also called BTO) but mentioned that other materials that meet these conditions ($e_r$>100 and n<Si) could be Titanium dioxide ($TiO_2$), Strontium titanate ($SrTiO_3$) and $BaSrTiO_3$. Generally speaking, a wide variety of Transition Metal Oxides (TMO) used in the Complementary Metal Oxide Semiconductor (CMOS) industry could be considered and are contemplated herewith.

The present disclosure proposes to apply this capacitive coupling concept to a carrier depletion modulator (i.e., a modulator making use of a PN junction or a combination of PN junctions as in a Series Push-Pull Mach-Zehnder Modulator (MZM)), leading to significant improvement in modulators.

Figure 2A:
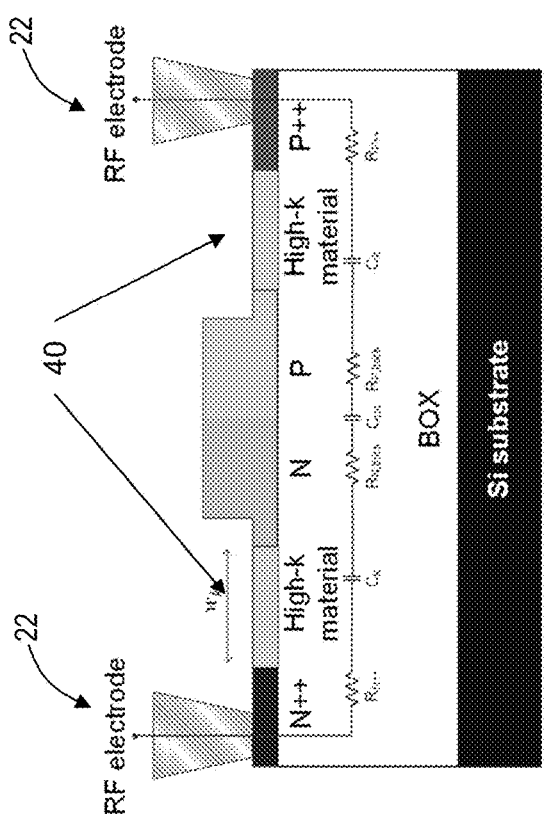
FIGS. 2A-2D are modulator diagrams including FIG. 2A as a Resistively-coupled carrier-depletion Mach-Zehnder Modulator (MZM), FIGS. 2B-2C as Capacitively-coupled carrier-depletion MZM with a thin and a thick high-k material (the use of high-k material enhances the capacitance and enables capacitive coupling), and FIG. 2D as a Modulator with both a resistive and a capacitive contacted PN junction. Note that, for simplicity, each FIG. illustrates only one PN junction being modulated (not a Series Push-Pull (SPP) configuration).

Again, presently, carrier-depletion MZMs use resistive coupling: the RF electrode's voltage is applied across the PN junction anode and cathode through doped-silicon material (a resistive section) in the slab of the optical waveguide (see FIG. 2A). The resistance in this path is mainly dominated by the resistance of the thin slab in the weakly doped areas on each side of the pn junction (e.g., thin N and P-doped slabs). Of note, the areas doped with N+ and P+ in FIGS. 2A and 2D could be replaced by N and P. These slabs make the electrical connection between the metal electrodes and the PN junction but is required to be thin in order that the optical mode remains well confined in the center of the rib waveguide. Doping the slab with progressively increasing concentration moving away from the waveguide center can be used to reduce the resistance in this region. The dopant concentration close to the waveguide center, where the optical mode is confined, cannot be increased too much because of the optical loss penalty incurred by absorption in doing so. At low frequencies, the impedance of the pn junction capacitor $(i\omega C_{pn})^{-1}$ is much larger than the impedance of the resistive elements; the voltage drop thus occurs almost completely across that capacitor. However, as the frequency increases, the impedance of the junction is reduced, which contributes to reducing the modulator bandwidth.

The access resistance has another strong impact in limiting the bandwidth of traveling-wave modulators based on a PN junction operated in depletion; it increases the RF propagation losses dramatically along the modulator. This loss increases with frequency, thus reducing the bandwidth of the modulator.

Figure 2B:
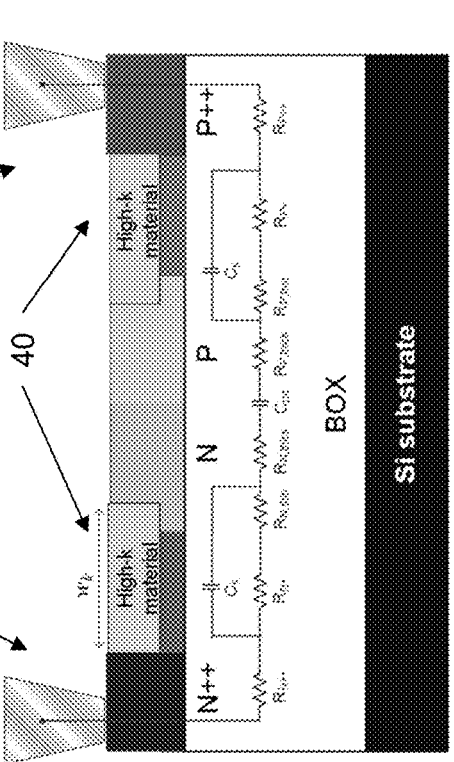

Two configurations that use the capacitive coupling scheme are proposed herein. In the first configuration (configuration 1), a capacitor of capacitance much larger than that of the PN junction is added between the RF electrode and the PN junction (one such capacitor in each region 40 in FIGS. 2B-2C). Doing so, and provided that the added capacitance is much larger than that of the PN junction, the voltage of the RF electrode is transferred more efficiently to the PN junction, avoiding the loss due to the thin slab of high resistance. The second configuration (configuration 2) is shown in FIG. 2D. The doped slab is still contacting the PN junction while adding a high-k material on top to achieve capacitive coupling. The access section in this configuration is thus a resistor in parallel with a capacitor. At low frequency, the impedance of this access section is equal to the resistance, but the capacitor reduces the impedance at large frequencies, thus improving the bandwidth of the modulator.

Figure 3:
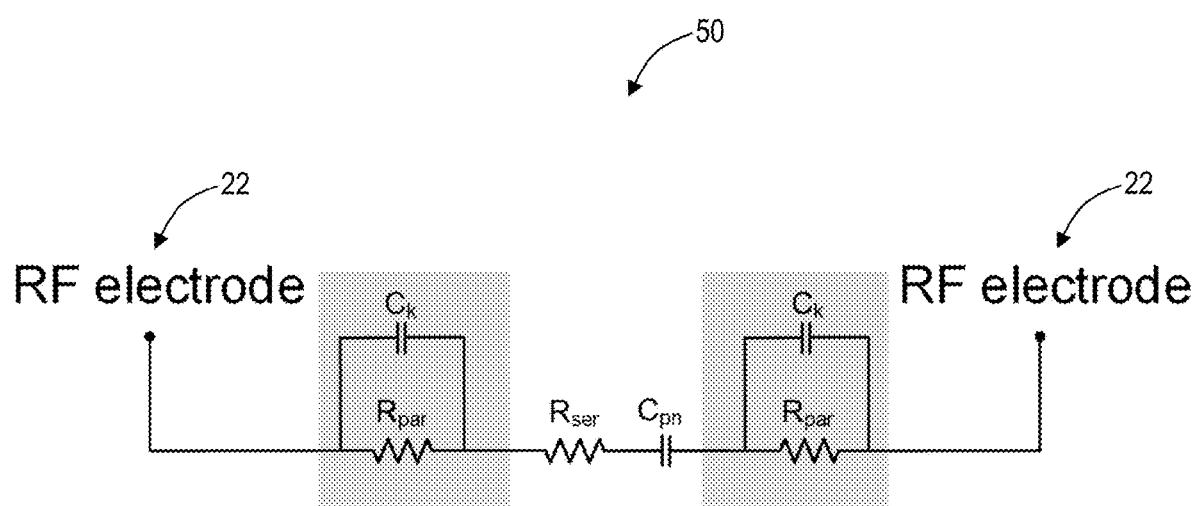
FIG. 3 is a circuit diagram of an equivalent circuit of capacitive coupling PN junction modulators. The shaded grey area is the contact area.

FIG. 3 shows an electrical circuit 50 that can be used to represent both configurations. Here $C_{pn}$ is the capacitance of the PN junction, $C_k$ is the access capacitance formed by the high-k material, $R_{ser}$ is the access resistance in series to $C_k$ whereas $R_{par}$ is the resistance in parallel to $C_k$. For configuration 1, $R_{par} \rightarrow \infty$.

For both configurations, the gain will be larger if $C_k \gg C_{pn}$. The main difference between the two configurations concerns what is happening at DC. When $R_{par} \rightarrow \infty$ (i.e., no thin slab), the bias voltage of the PN junction needs to be brought from somewhere else since $C_k$ blocks the DC signal. Furthermore, if $C_k$ is only somewhat larger than $C_{pn}$, configuration 1 will have a larger BW than configuration 2, but the voltage drop that will appear around $C_k$ will effectively degrade the modulator DC $V_{pi}$. For configuration 2, the low frequencies/DC components will be unchanged, thus maintaining the $V_{pi}$ (in comparison to the resistive coupling scheme). However, the presence of $C_k$ modifies the access impedance, which was originally given by $R_{ser}+2R_{par}$ to be:

$$Z = R_{ser} + \frac{2R_{par}}{1 + i\omega R_{par} C_k}. \quad (1)$$

Thus, since the high-frequency impedance of the contact area is reduced, the modulator BW is improved.

Some performances are shown in FIGS. 4A-4C and 5A-5C with various $R_{par}$, $R_{ser}$ and $C_k$ in the context of a SPP modulator.

Figure 2C:
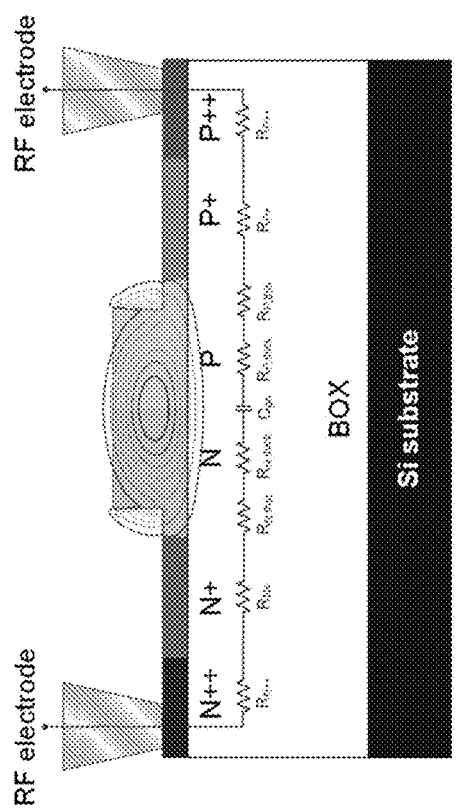
Figure 2D:
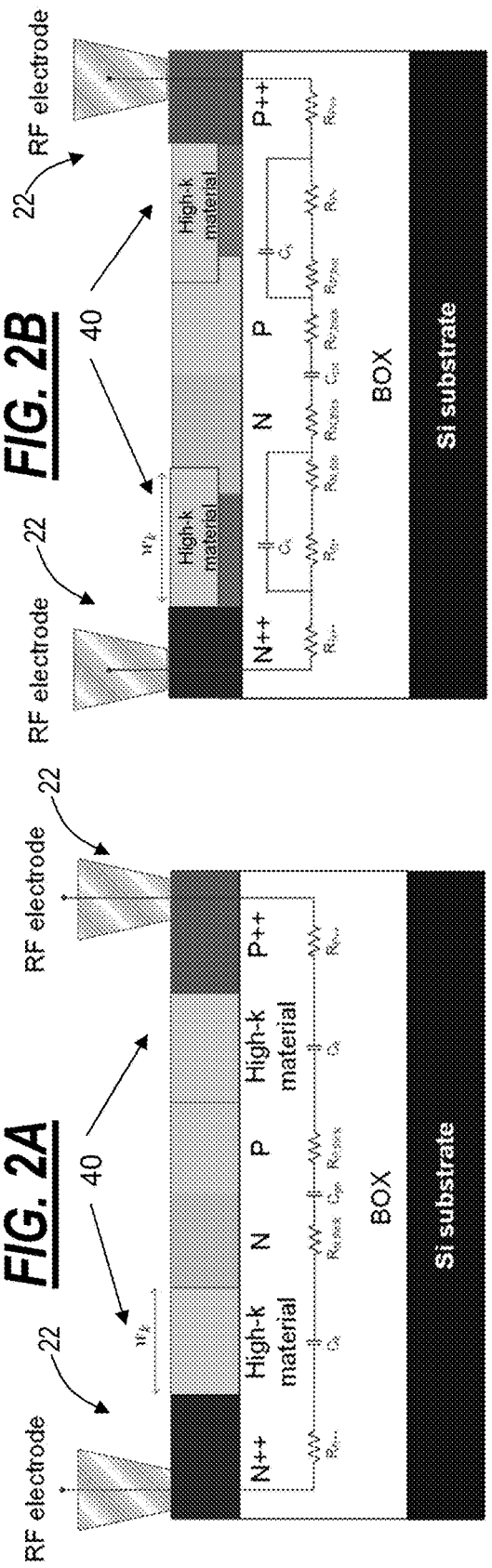
Figure 4A:
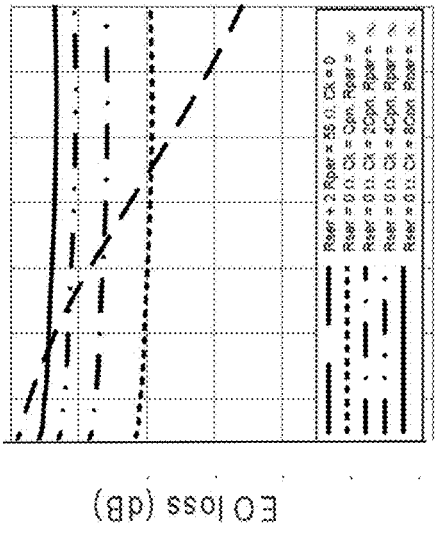
FIGS. 4A-4C are graphs of the capacitive coupling EO response for various situations when $R_{par} \to \infty$). The different curves represent the situation where $C_k$ is equal to $C_{pn}$, $2C_{pn}$, $4C_{pn}$ and $8C_{pn}$, respectively. a), b) and c) represents the situation when $R_{ser}$=0 Ω, 15Ω and 30Ω respectively.
Figure 4B:
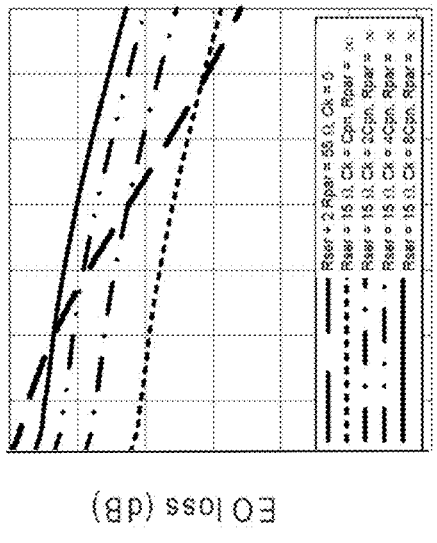
Figure 4C:
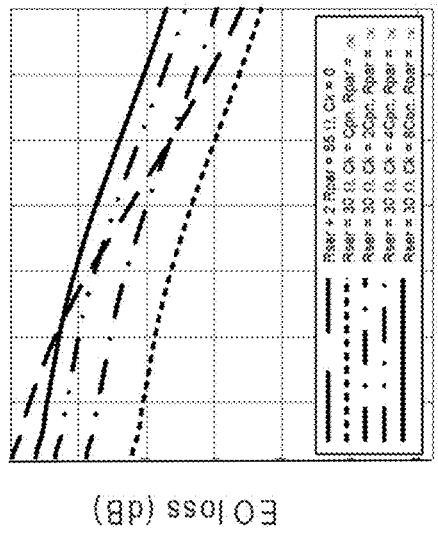

FIG. 4 shows the EO response with a capacitive-only coupling (i.e., $R_{par} \rightarrow \infty$, configuration 1), like the ones shown in FIGS. 2C and 2D. In each subfigure, the long dashed curves represent a legacy modulator with $R_{ser}+2R_{par}=55\Omega$ (i.e., resistive coupling with $C_k=0$). The other curves represent the situation with capacitive coupling where $C_k$ is equal to $C_{pn}$, $2C_{pn}$, $4C_{pn}$ and $8C_{pn}$, respectively. As mentioned before, the value at low frequency is smaller when $C_k$ is small and tends toward the legacy modulator as $C_k$ increases. The amount of RF power at high frequency is also improving drastically as $C_k$ increases. FIGS. 4A-4C represent the situation when $R_{ser}=0\Omega$, $15\Omega$ and $30\Omega$ respectively. Obviously, this access resistance increase reduces the benefit of the capacitance coupling. As a result, an optimal design will aim to completely replace the access resistance by a large coupling capacitance.

Figure 5A:
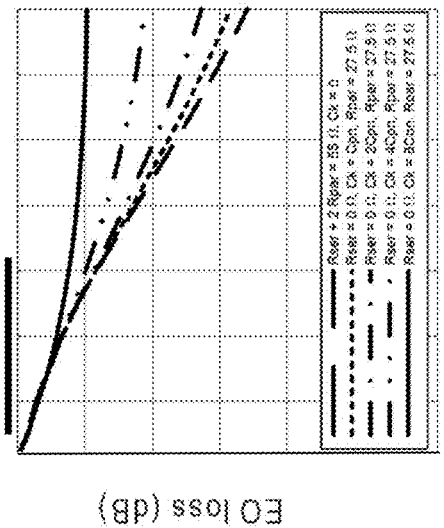
FIGS. 5A-5C are graphs of the capacitive coupling EO response for various situations when $R_{par} \neq \infty$). The different curves represent the situation where Ck is equal to $C_{pn}$, $2C_{pn}$, $4C_{pn}$ and $8C_{pn}$, respectively. a), b) and c) represents the situation when $R_{ser}$=0 Ω, 15Ω and 30Ω respectively. For every curve, $R_{ser}+2R_{par}$=55Ω.
Figure 5B:
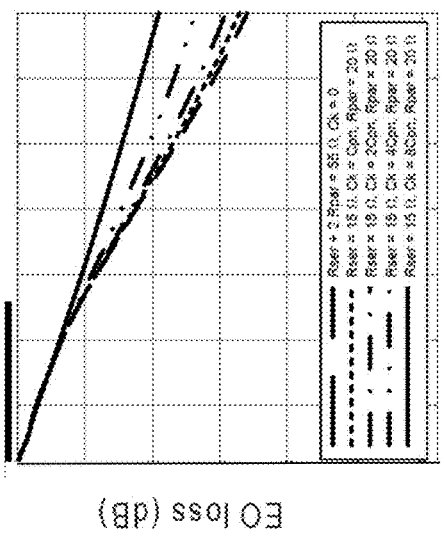
Figure 5C:
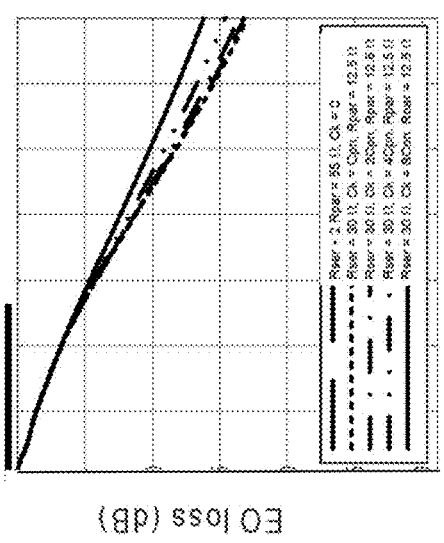

A similar set of simulations was made with a capacitive coupling in parallel with a resistive element (configuration 2), like the one shown in FIG. 2D. The EO responses are shown in FIGS. 5A-5C. The total access resistance is fixed at $55\Omega$ (i.e., $R_{ser}+2R_{par}$) as for the legacy modulator (long dashed curves), but the proportion between $R_{ser}$ and $R_{par}$ are changed. Once again, the other curves represent the situation where $C_k$ is equal to $C_{pn}$, $2C_{pn}$, $4C_{pn}$ and $8C_{pn}$, respectively. FIGS. 5A-5C represent the situation when $R_{ser}=0\ \Omega$, $15\Omega$ and $30\Omega$ respectively. When a resistor is in parallel to $C_k$, the DC response is not changed; as explained before, only the high-frequency response of the modulator is improved. The modulator EO response improvement is larger when $C_k$ is large and when this capacitor is in parallel with most of the access resistance ($R_{ser} \rightarrow 0$).

To maximize the capacitance of the high-k region, its width should be kept as small as possible. This has a potential drawback: a narrow gap between the central silicon waveguide and the side-silicon electrical rails supporting the contacts can lead to signal losses due to evanescent wave coupling from the waveguide to the rails. So, to maximize the benefit of this idea, it is imperative to have an optical mode strongly confined within the center core. Having a very confined mode will allow reducing the capacitance of the modulator if $V_{pi}$ is kept the same. This can be done by reducing the concentration of dopants in the center PN junction region, for example. Another interesting possibility is to use a TM mode for the modulator, supported by a very narrow but tall silicon waveguide. As a result, these scenarios will enable a larger $C_k$ to $C_{pn}$ ratio, thus improving the EO response and/or the effective $V_{pi}$ at low frequency (for configuration 1).

Furthermore, as shown in FIGS. 2B, 2C and 2D, the high-k material must be positioned as close to the center waveguide core as possible to reduce $R_{ser}$. However, to have a large $C_k$, the width of the high-k material ($w_k$) should be as small as possible. If the mode is not strongly confined within the core, the side dopant will still have to be weakly doped (P/N or P+/N+) to limit the optical loss, which will leave a fairly large $R_{ser}$ value. On the other hand, if the mode is strongly confined, the dopant close to the RF electrode could be heavily doped, thus providing a very small $R_{ser}$.

Biasing the PN junction with a DC reverse voltage is important to allow reducing the capacitance of the PN junction to increase the bandwidth. This is particularly important here for keeping the PN junction capacitance at a value much lower than the capacitance of the high-k capacitor. The bias voltage can be applied as usual with configuration 2, but some care must be taken for configuration 1 since $C_k$ acts as a high-pass filter.

This can be done in the following ways (other options should be possible around those illustrated here). The following FIGS. 7 and 8 illustrate a NPPN Series Push-Pull configuration with T segments, where the p-doped layer in the center is biased with a negative voltage ($V_{bias}$), whereas the n-doped layers on each side are connected to the ground.

Figure 6:
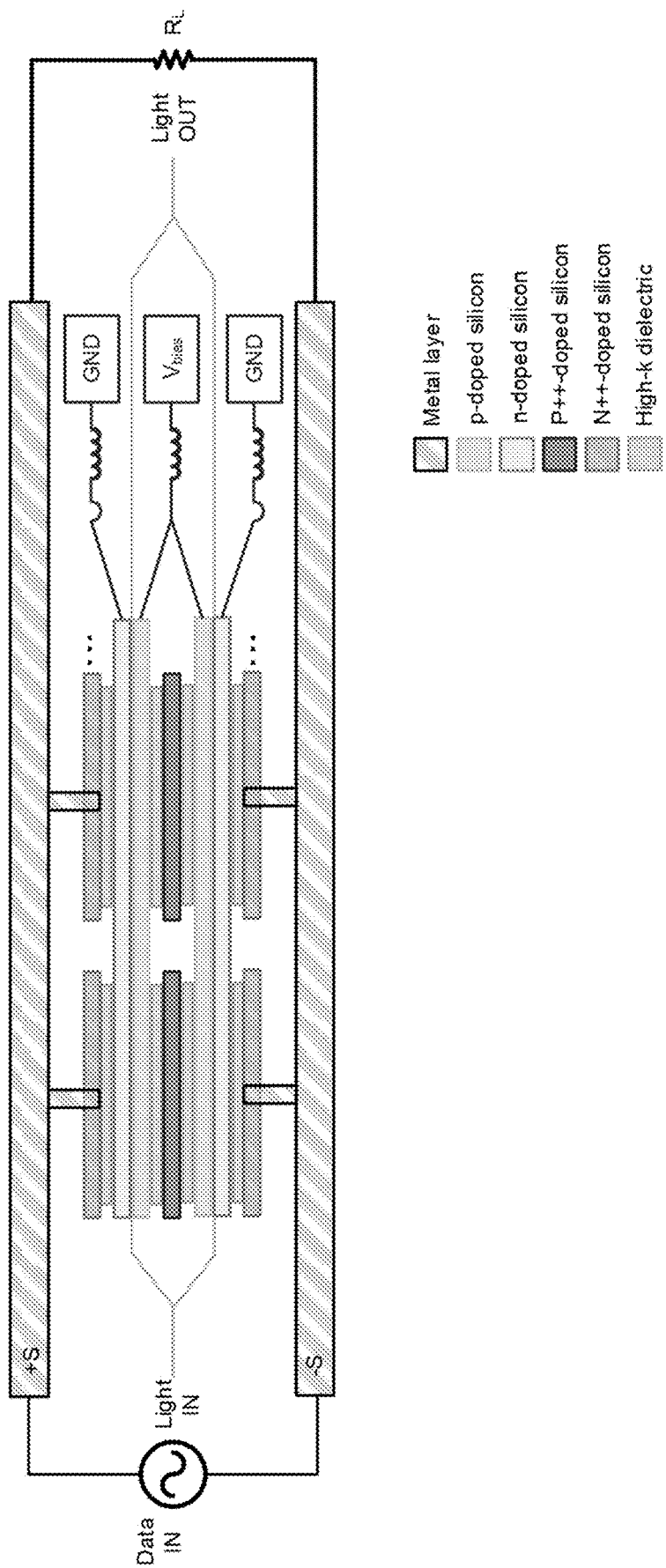
FIG. 6 is an example of PN junction biasing using doped regions extending through all the modulator's length to connect to a voltage source or ground terminals at its extremity.

FIG. 6 shows the p and n-doped regions in each waveguide to be continuous to ensure proper biasing of the PN junction: these regions are extending through all the modulator length, and they connect at one extremity of the modulator (or both) to DC supplies. The center p-doped region is connected to a negative voltage supply while the n-doped regions on the sides are connected to the ground. The highly doped regions (P++ and N++), used to bring the RF signal and realize the SPP configuration, are separated from the p and n regions by the region filled with the high-k dielectric. These highly doped regions can be separated if T-segments are used (like illustrated here), or not.

Figure 7:
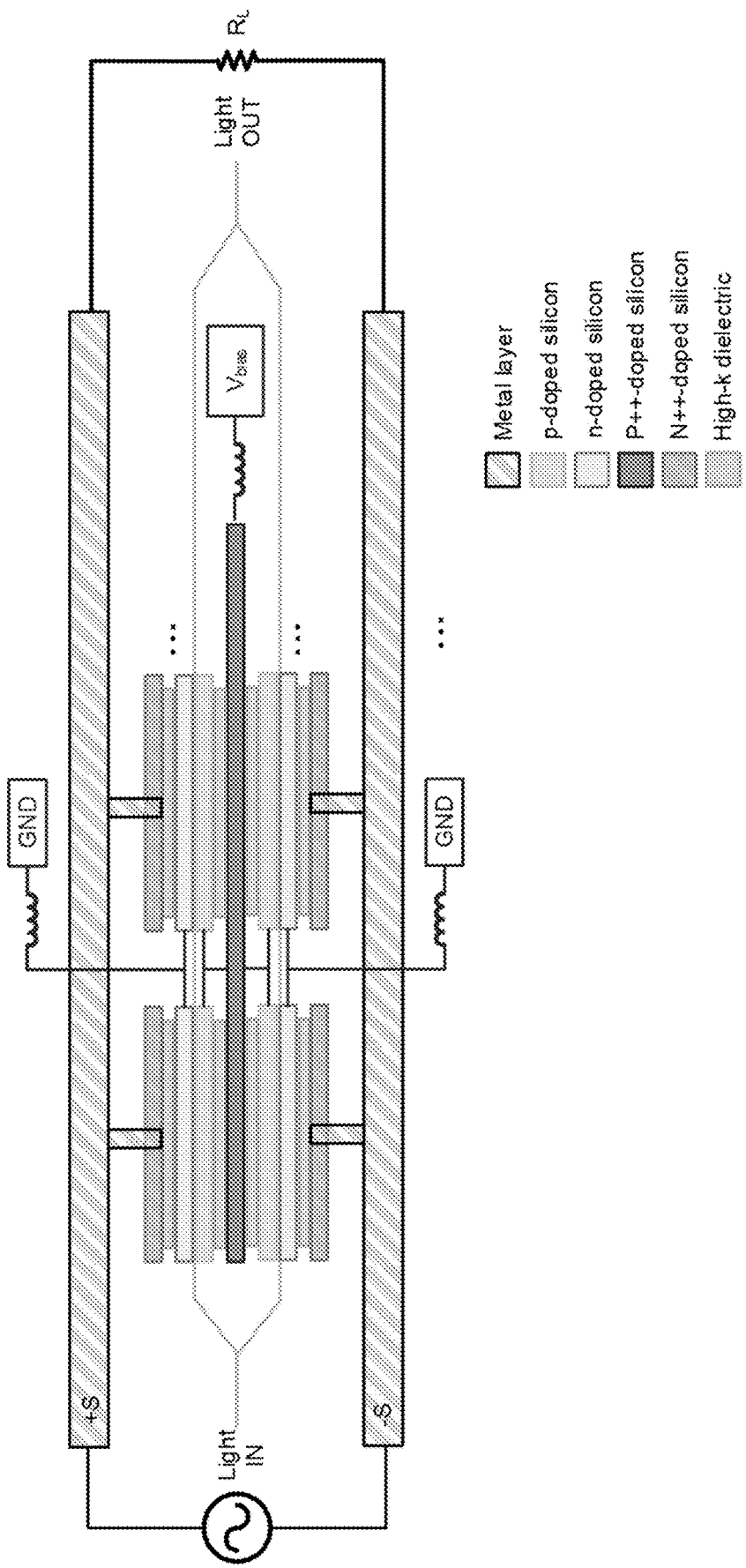
FIG. 7 is an example of PN junction biasing using a doped central region extending through all the modulator's length to connect to a voltage source at its extremity and connections to the ground in between every T-segments.

Another option illustrated in FIG. 7 is to have the n-doped regions on the sides of each waveguide connected to the ground between each T-segments. The center p-doped region is connected between each T-segment to a central bus running along the modulator length and connected to the bias voltage source.

Figure 8:
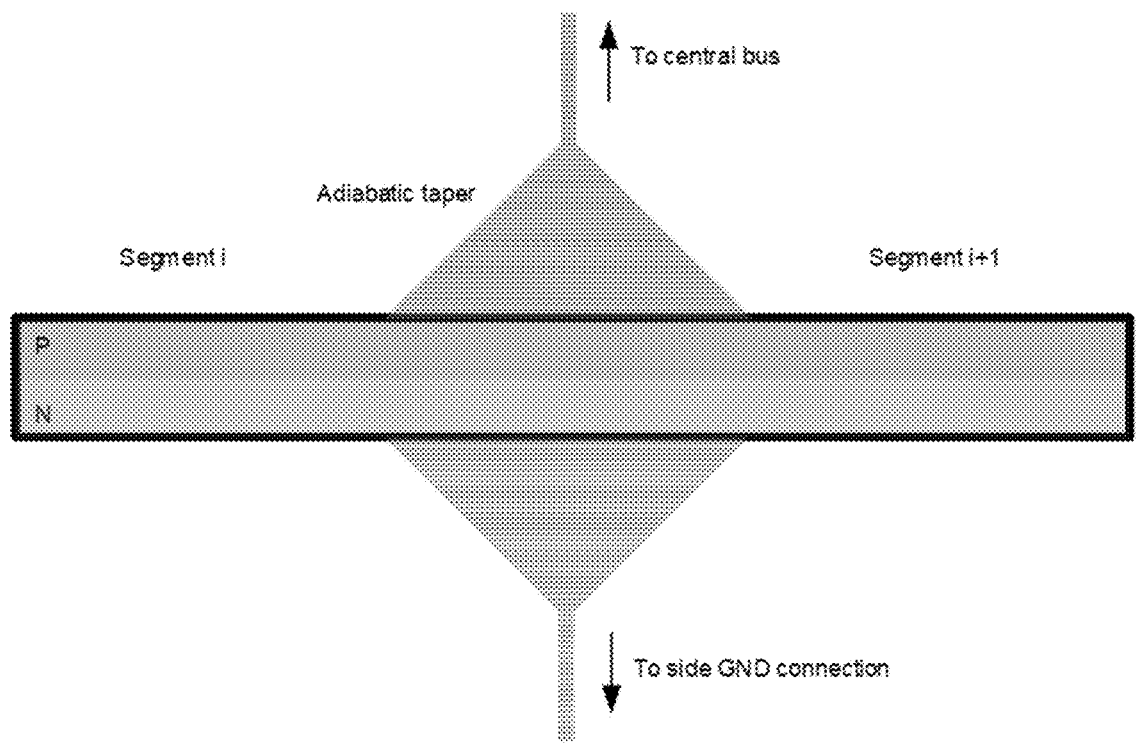
FIGS. 8 and 9 are examples of connections between the segments.

More specifically, an example of the connection between the segments is illustrated in FIG. 8. The PN-doped strip waveguide (illustrated by the thick rectangle) is converted into a rib waveguide (the thinner parts of the waveguide are illustrated by the hatched areas) and converted back into a strip waveguide for the next segment. This allows sending doped silicon wires to the central and side buses.

Figure 9:
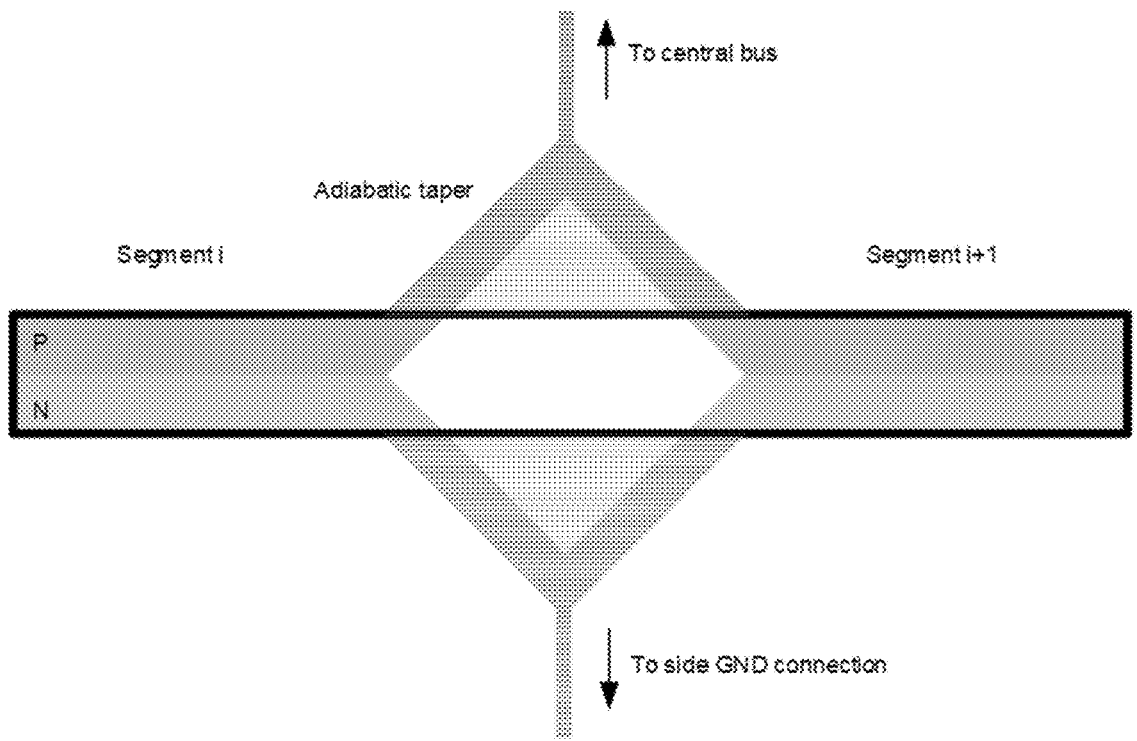

The doped area in this section could be customized to reduce the propagation losses between the sections, as illustrated in FIG. 9.

Such biasing scheme applies well to configuration 1 (pure capacitive coupling).

The previous discussion also applies to a modulator that would not use T-segments connecting periodically to the RF line.

The modulator can be a Mach-Zehnder modulator or any other type of modulator.

The modulator can be a phase modulator or an intensity modulator.

The modulator can be a Series Push-Pull modulator or not.

The idea is compatible with other PN junction shapes (L-shape, U-shape).

The idea could be well suited for use with the TM modulator in a thick silicon waveguide, such as described in previously cited U.S. patent application Ser. No. 16/554,736.

The idea presented here is compatible with schemes to make the modulator robust to fabrication errors, such as 1) RF imbalance compensation using different configurations of dopants orientations and connections to the RF line, such as described in commonly-assigned U.S. Pat. No. 10,823,988, and 2) RF line crossing and reversal of dopant orientation, such as described in commonly-assigned U.S. patent application Ser. No. 16/944,809, the contents of each are incorporated by reference in their entirety.

Figure 10:
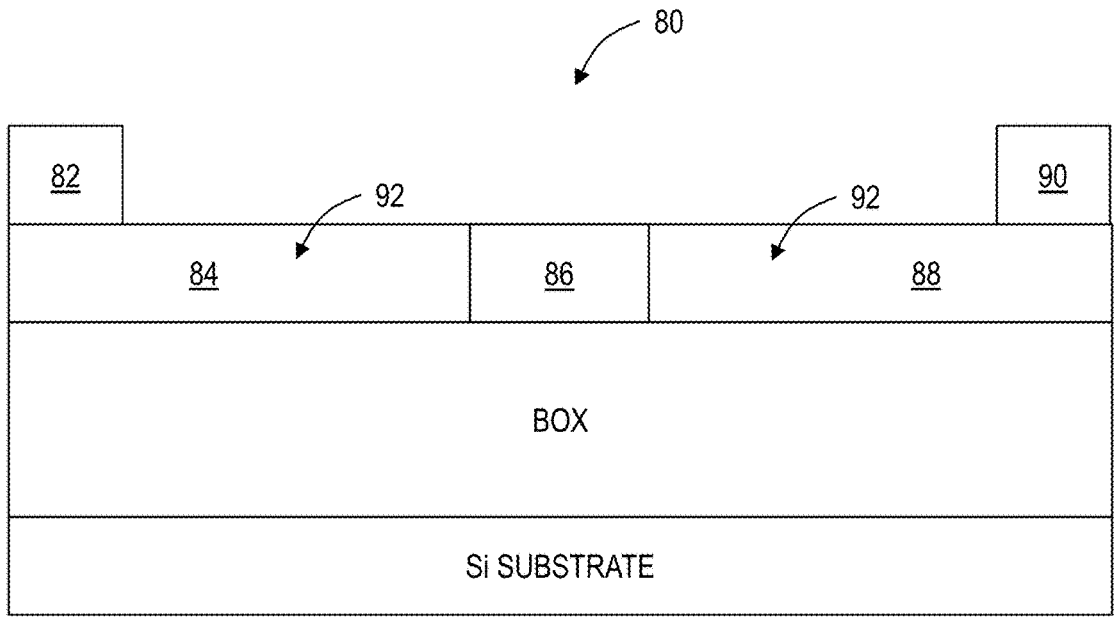
FIG. 10 is a block diagram of a modulator utilizing the capacitive coupling described herein.

FIG. 10 is a block diagram of a modulator 80 utilizing the capacitive coupling described herein. Of note, the block diagram is a logical view and contemplates any of the foregoing embodiments. The modulator 80 includes a first electrode 82; a first slab 84 connected to the first electrode 82 at a first end; a rib 86, with a pn junction, connected to the first slab 84 at a second end of the first slab 84; a second slab 88 connected to the rib 86 at a first end; a second electrode 90 connected to the second slab 88 at a second end of the second slab; and high-k dielectric material 92 disposed in or on a portion of each of the first slab 84 and the second slab 88, thereby enabling capacitive coupling.

A capacitance ($C_k$) of the high-k dielectric material 92 is larger than a capacitance ($C_{pn}$) of the rib 86. The rib 86 can have a larger height than the first slab 84 and the second slab 88, such as in FIG. 2B. The high-k dielectric material 92 can be located in the first slab 84 and the second slab 88, see FIGS. 2B and 2C. The high-k dielectric material 92 can be located on a top portion of the first slab 84 and the second slab 88, such as in FIG. 2D. The first slab 84 and the second slab 88 include progressively increasing concentration doping moving away from the rib 92, to reduce resistance in this region, such as shown in FIGS. 8 and 9, which are top views of the doping. An optical mode is confined to the rib 92 based on a concentration of dopants, again as shown in FIGS. 8 and 9.

The modulator can be any of a Mach-Zehnder modulator, a phase modulator, an intensity modulator, a Series Push-Pull modulator, and a Transverse Magnetic modulator, having a taller rib than the first and second slabs.

In another embodiment, a modulator circuit includes a pair of electrodes 82, 90; a pair of slabs 84, 88; a rib 86 in between the pair of slabs 84, 88; wherein the pair of slabs 84, 88 has a capacitance of $C_k$ and resistance of $R_{par}$, wherein the rib 86 has a capacitance of $C_{pn}$ and resistance of $R_{ser}$, and wherein $C_k \gg C_{pn}$. Of note, FIG. 3 illustrates an example of the modulator circuit. The modulator circuit exhibit an impedance of $$Z = R_{ser} + \frac{2R_{par}}{1 + i\omega R_{par} C_k},$$

which at high frequency will be reduced, thus improving the bandwidth of the modulator circuit. The pair of slabs 84, 88 include a high-k dielectric material 92, located therein or on top.

Figure 11:
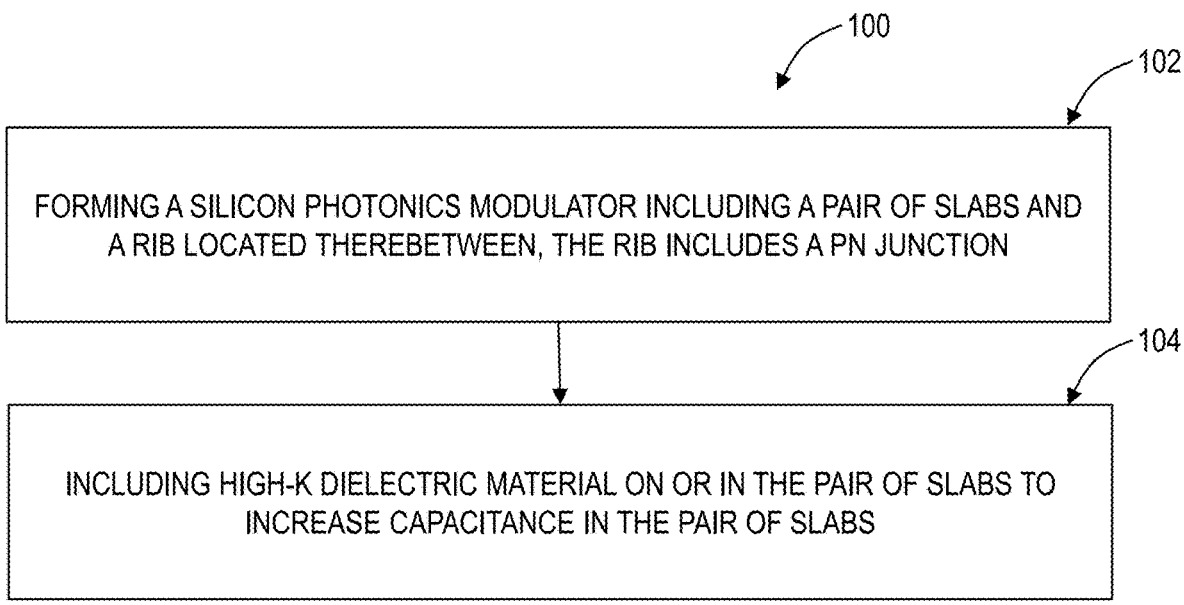
FIG. 11 is a flowchart of a process for forming a modulator with capacitive coupling.

FIG. 11 is a flowchart of a process 100 for forming a modulator with capacitive coupling. The process 100 includes forming a silicon photonics modulator including a pair of slabs and a rib located therebetween, the rib includes a pn junction (step 102); and including high-k dielectric material on or in the pair of slabs to increase capacitance in the pair of slabs (step 104). A capacitance ($C_k$) of the high-k dielectric material is larger than a capacitance ($C_{pn}$) of the rib. The process 100 can also include providing a connection to apply a bias voltage to the pn junction. This is a novel element compared to the slot waveguide case where no biasing is required.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A modulator comprising:
a first electrode;
a first slab connected to the first electrode at a first end;
a rib, with a pn junction, connected to the first slab at a second end of the first slab;
a second slab connected to the rib at a first end;
a second electrode connected to the second slab at a second end of the second slab; and
high-k dielectric material disposed in or on a portion of each of the first slab and the second slab, thereby enabling capacitive coupling.

2. The modulator of claim 1, wherein a capacitance ($C_k$) of the high-k dielectric material is larger than a capacitance ($C_{pn}$) of the rib.

3. The modulator of claim 1, wherein the rib has a larger height than the first slab and the second slab.

4. The modulator of claim 1, wherein the high-k dielectric material is located in the first slab and the second slab.

5. The modulator of claim 1, wherein the high-k dielectric material is located on a top portion of the first slab and the second slab.

6. The modulator of claim 1, wherein the first slab and the second slab include progressively increasing concentration doping moving away from the rib, to reduce resistance in this region.

7. The modulator of claim 1, wherein the modulator is a Mach-Zehnder modulator.

8. The modulator of claim 1, wherein the modulator is a phase modulator.

9. The modulator of claim 1, wherein the modulator is an intensity modulator.

10. The modulator of claim 1, wherein the modulator is a Series Push-Pull modulator.

11. The modulator of claim 1, wherein the modulator is a Transverse Magnetic modulator, having a larger rib than the first and second slabs.

12. The modulator of claim 1, further comprising
a connection to apply a bias voltage to the pn junction.

13. A modulator circuit comprising:
a pair of electrodes;
a pair of slabs;
a rib, with a pn junction, in between the pair of slabs;
wherein the pair of slabs has a capacitance of $C_k$ and resistance of Rear,
wherein the rib has a capacitance of $C_{pn}$ and resistance of $R_{ser}$, and
wherein $C_k \gg C_{pn}$.

14. The modulator circuit of claim 13, wherein the modulator circuit includes a high frequency impedance of $$Z = R_{ser} + \frac{2R_{par}}{1 + i\omega R_{par} C_k},$$

thereby reducing the high frequency impedance and improving bandwidth of the modulator circuit.

15. The modulator circuit of claim 13, wherein the pair of slabs include a high-k dielectric material.

16. The modulator circuit of claim 13, wherein the pair of slabs include a high-k dielectric material located on top of the pair of slabs.

17. The modulator circuit of claim 13, wherein the rib has a larger height than the pair of slabs.

18. The modulator circuit of claim 13, further comprising a connection to apply a bias voltage to the pn junction.

19. A method comprising:
forming a silicon photonics modulator including
a first electrode;
a first slab connected to the first electrode at a first end;
a rib, with a pn junction, connected to the first slab at a second end of the first slab;
a second slab connected to the rib at a first end;
a second electrode connected to the second slab at a second end of the second slab; and
high-k dielectric material disposed in or on a portion of each of the first slab and the second slab, thereby enabling capacitive coupling.

20. The method of claim 19, further comprising
providing a connection to apply a bias voltage to the pn junction.

* * * * *